United States Patent
Bajuyo et al.

(10) Patent No.: US 7,083,148 B2
(45) Date of Patent: Aug. 1, 2006

(54) ASSEMBLY FOR CARRYING AND EJECTING STORES

(75) Inventors: Ronaldo A. Bajuyo, Indianapolis, IN (US); Benjamin J. Galanti, Indianapolis, IN (US); Armando Guerrero, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/996,000

(22) Filed: Nov. 23, 2004

(65) Prior Publication Data

US 2006/0108478 A1    May 25, 2006

(51) Int. Cl.
*B64D 1/02* (2006.01)
(52) U.S. Cl. .................. 244/137.4; 89/1.54
(58) Field of Classification Search ............ 244/137.4; 89/1.54, 1.58, 1.53; 294/82.26
See application file for complete search history.

(56) References Cited

U.S. PATENT DOCUMENTS

| | | | |
|---|---|---|---|
| 2,366,704 A | | 1/1945 | Austin et al. |
| 4,043,525 A | * | 8/1977 | Jakubowski, Jr. ........ 244/137.4 |
| 4,196,879 A | * | 4/1980 | Craigie .................... 244/137.4 |
| 4,318,561 A | * | 3/1982 | Hasquenoph et al. .... 294/82.26 |
| 4,407,180 A | * | 10/1983 | Regnat ....................... 89/1.53 |
| 4,441,674 A | * | 4/1984 | Holtrop .................... 244/137.4 |
| 4,600,171 A | | 7/1986 | Kalisz |
| 5,052,639 A | * | 10/1991 | Lemacon .................. 244/137.4 |
| 5,092,542 A | | 3/1992 | Ellis et al. |
| 5,438,404 A | | 8/1995 | Hamilton et al. |
| 5,904,323 A | * | 5/1999 | Jakubowski et al. ..... 244/137.4 |
| 5,932,829 A | * | 8/1999 | Jakubowski, Jr. ........... 89/1.54 |
| 6,035,759 A | * | 3/2000 | Jakubowski et al. ......... 89/1.54 |
| 6,176,167 B1 | | 1/2001 | Sanderson |
| 6,250,195 B1 | | 6/2001 | Mendoza et al. |
| 6,688,209 B1 | | 2/2004 | McMahon et al. |

FOREIGN PATENT DOCUMENTS

IT    293144    1/1936

* cited by examiner

*Primary Examiner*—Galen Barefoot
(74) *Attorney, Agent, or Firm*—Renner, Otto, Boisselle & Sklar, LLP

(57) ABSTRACT

A carriage and ejection assembly for retaining different types of stores to an aircraft and selectively ejecting a carried one of the stores away from the aircraft is disclosed. The assembly can include a sway brace having at least one contact location for each type of store, wherein during ejection of the carried store by actuation of the sway brace, the at least one contact location corresponding to the carried store applies a pitch downward moment to the carried store. Another feature of the assembly can include a direct connection of the sway brace to a moveable part of an ejection actuator. Another feature of the assembly can include independent latching and unlatching of plural store retaining hooks of the assembly. Another feature can include a compressor for pressurizing a piston of the assembly that is carried by the aircraft. Yet another feature can include a hook release actuator placed in series with and upstream of an ejector actuator.

24 Claims, 5 Drawing Sheets

# ASSEMBLY FOR CARRYING AND EJECTING STORES

TECHNICAL FIELD

The present invention relates to devices and methods for mounting stores, such as missiles and bombs, to an aircraft for carriage and ejecting the stores during flight.

BACKGROUND

Aircraft have been used to transport and deliver various types of stores. Stores can include, but are not limited to, missiles, bombs, drones (e.g., unmanned aircrafts), weather probes, aid packages and so forth. As one may expect, the stores that any one aircraft can transport and deliver can vary in size, weight and geometrical configuration. In some arrangements, each store includes one or two lugs that are retained by a corresponding member of the aircraft during carriage of the store. To deliver the store, the lug is released to free the store from the aircraft.

In many situations, when the store is released from the aircraft for delivery to a target location, it is desirable that the store is ejected away from the aircraft with a slightly "nose down" orientation. In the past, such ejection has been accomplished with an explosive device, including cartridge actuated devices (CADs). However, the use of explosive ejection devices has inherent risks associated with the volatile nature of the device.

In addition, many conventional carriage and ejection mechanisms are arranged to interact with a single type of store. Therefore, if a different type of store than previously carried by the aircraft is to be carried by the aircraft, it may be necessary to change the carriage and ejection mechanism before the aircraft can accept the different type of store. Such a process can be time consuming and requires that at least one carriage and ejection mechanism for each type of store is available at the landing site of the aircraft.

Accordingly, there is a need in the art for an improved carriage and ejection assembly.

SUMMARY OF THE INVENTION

According to one aspect of the invention, a carriage and ejection assembly for retaining different types of stores to an aircraft and selectively ejecting a carried one of the stores away from the aircraft includes a sway brace having at least one contact location for each type of store, wherein during ejection of the carried store by actuation of the sway brace, the at least one contact location corresponding to the carried store applies a pitch downward moment to the carried store with respect to the aircraft; and an ejection actuator coupled to the sway brace for actuating the sway brace.

According to another aspect of the invention, a carriage and ejection assembly for retaining a store to an aircraft and selectively ejecting the store away from the aircraft includes a sway brace that contacts the store in one or more locations that, during actuation of the sway brace, applies a pitch down moment to the store with respect to the aircraft; and an ejection actuator having a moveable part for actuating the sway brace, the moveable part directly connected to the sway brace.

According to yet another aspect of the invention, a carriage and ejection assembly for retaining a store to an aircraft and selectively ejecting the store away from the aircraft includes a sway brace that contacts the store in one or more locations that, during actuation of the sway brace, applies a pitch downward moment to the store with respect to the aircraft; at least one hook that selectively retains a lug of the store and positions the store to be contacted by the sway brace; a hook release actuator coupled to a hook control member that when actuated by movement of the hook release actuator releases the hook; and an ejection actuator coupled to the sway brace to actuate the sway brace, wherein the ejection actuator is connected in series with and downstream from the hook release actuator.

According to still another aspect of the invention, a carriage and ejection assembly for retaining different types of stores to an aircraft and selectively ejecting a carried one of the stores away from the aircraft, each store having one of a single lug or a pair of lugs includes a first hook that selectively retains the lug of single lug stores and a first lug of the double lug stores; a second hook that selectively retains a second lug of the double lug stores; and a control member for each hook, each control member having a retaining position in which the control member asserts a retaining force on the corresponding hook and a release position to free the corresponding hook such that the hook may pivot, each control member is positionable independently of the other control member to individually release the corresponding hook for unlatching of the corresponding lug.

According to one more aspect of the invention, a carriage and ejection assembly for retaining a store to an aircraft and selectively ejecting the store away from the aircraft includes at least one piston to actuate a moveable component of the carriage and ejection assembly; and a compressor mounted to be carried by the aircraft to pressurize the at least one piston.

BRIEF DESCRIPTION OF DRAWINGS

These and further features of the present invention will be apparent with reference to the following description and drawings, wherein.

DESCRIPTION

Figure 1:
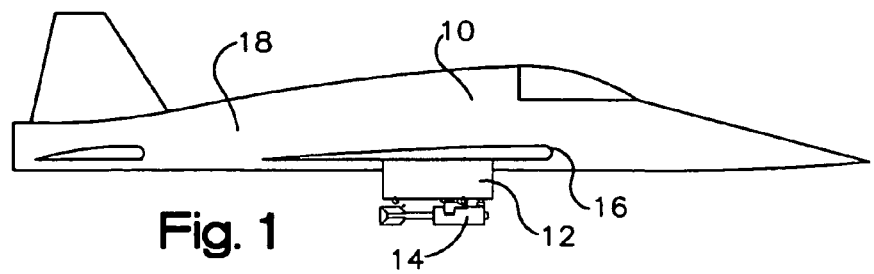
FIG. 1 is a side view of an aircraft that includes a carriage and ejection assembly according to the present invention.

In the description that follows, like components have been given the same reference numerals, regardless of whether they are shown in different embodiments of the present invention. To illustrate the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Referring to FIG. 1, shown is an aircraft 10 that includes at least one carriage and ejection assembly 12 for carrying and ejecting a store 14. The carriage and ejection assembly 12 also may be referred to as a bomb rack or an ejector. The illustrated aircraft is a military, combat style aircraft that is capable of achieving high speeds (e.g., 0.5 mach to over a mach) and the carriage and ejection assembly 12 can eject the store 14 at such high speed. In a typical arrangement, the carriage and ejection assembly 12 is mounted to an underside of a wing 16 or a fuselage 18 of the aircraft 12. It will be appreciated that the carriage and ejection assembly 12 can be used with other types of aircraft, such as rotary winged aircraft (e.g., helicopters).

The carriage and ejection assembly 12 is adapted to carry and eject more than one type of store 14, although in the illustrated embodiment only one store can be carried at a time. For example, two or more types of stores 14, each type potentially having a different size, weight and/or geometrical configuration, can be accommodated by the carriage and ejection assembly 12.

Figure 2:
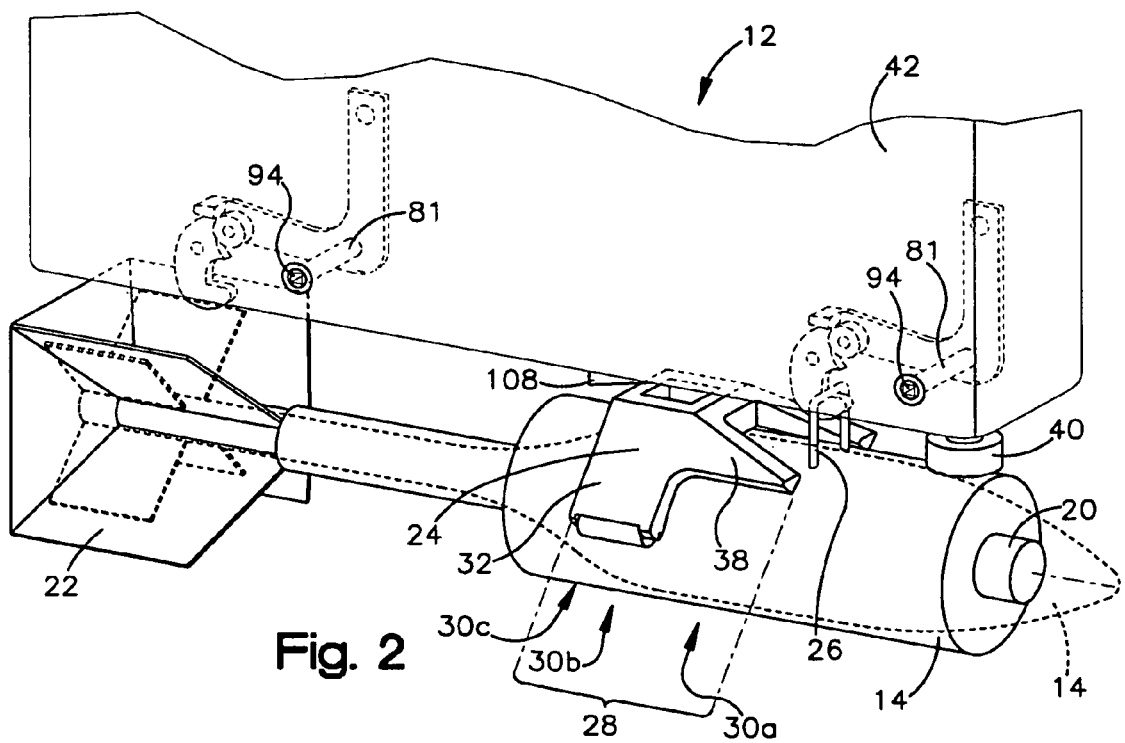
FIG. 2 is a perspective view of the carriage and ejection assembly with one store shown overlaid with another store for generation of a multi-store composite ejection zone.

Referring to FIG. 2, shown is the carriage and ejection assembly 12 with a store 14 retained in a carriage position (or in-flight position). A second store 14 is shown in dashed lines and overlaid with the other store for generation of a multi-store composite ejection zone, which is described in greater detail below.

In most situations, it is desirable to eject the store 14 from the carriage and ejection assembly 12 to achieve a slightly "nose down" orientation, or attitude, of the store 14. That is, after ejection, the store 14 is tilted slightly such that a forward end 20 of the store 14 is lower than an aft end 22, although this relative positioning may depend on the inclination of the aircraft 10 during ejecting of the store 14. To achieve such ejection, the carriage and ejection assembly 12 applies a pitch down moment to the store 14, where the pitch down moment is with respect to the heading of the aircraft. The pitch down moment is accomplished by applying force to the store 14. The force can be applied in a perpendicular manner to the longitudinal axis of the store 14 (e.g., radially with respect to the store 14) or otherwise in a direction transverse to the longitudinal axis of the store 14. It is noted that the force need not be applied in a manner such that the force is concentrated through the longitudinal axis of the store 14. The force is generally forward of a center of gravity (CG) of the store 14. Preferably, the application of force to the store 14 is not too far forward of the center of gravity so as to avoid end-over-end rotation (e.g., "pin wheeling") of the store 14 following ejection.

The location upon which ejecting force should be applied to each type of store 14 may be different. However, according to one aspect of the invention, the carriage and ejection assembly 12 can accommodate multiple types of stores 14 without substantial change to the physical configuration of the carriage and ejection assembly 12 and/or replacement of all or some of the parts of the carriage and ejection assembly 12.

To achieve ejection of plural types of stores 14 and minimize reconfiguring of the carriage and ejection assembly 12 for each type of store 14, the carriage and ejection assembly 12 includes a sway brace 24 that is operative to apply force in a desired location for each type of store 14 when actuated in a downward direction. The sway brace 24 also can be configured to minimize swaying (e.g., twisting) of the store 14 during carriage of the store 14. However, the term sway brace is used herein in its broadest sense and is explicitly defined to include devices that may not function to reduce swaying or twisting of the store 14. For example, a separate member can be included with the carriage and ejection assembly 12 to control swaying or twisting of the store 14, particularly during flight. In addition, the term sway brace should be interpreted to include any members attached to a main sway brace member and adapted to make contact with any one of the stores.

The configuration of the sway brace 14 can depend on the types of stores 14 that may be carried and ejected by the carriage and ejection assembly 12. Therefore, in one embodiment, the sway brace 14 can be designed for a specific set of stores 14. Such a design process can include examining each store 14 to determine a desired location or locations for the application of ejecting force. A location or group of locations on the store 14 upon which force can be applied to achieve satisfactory ejection will be referred to herein as a load point.

In the illustrated embodiment, each of the stores 14 is secured to the carriage and ejection assembly 12 during carriage by at least one lug 26 that extends vertically from the store 14. Some stores 14 may be retained by a pair of spaced apart lugs 26. In the illustrated embodiment, the forward lug 26 of a store 14 with two lugs 26 attaches to the carriage and ejection assembly 12 in the location that the sole lug 26 of a one lug 26 store 14 attaches to the carriage and ejection assembly 12. Since the lug 26 of each store 14 (or forward lug 26 of a two lug 26 store 14) serves as a common hang point for all of the stores 14, the relative location of each store 14 during carriage can be determined.

By relating the physical configuration of all of the stores 14 in their carriage positions to one another, a composite ejection zone 28 can be determined. The composite ejection zone 28 is a three dimension mapping of the each of the load points for the respective stores. To assist in this process, a computer model can be used to overlay each store 14 in their respective carriage positions. In the example of FIG. 2, two stores 14 are shown overlapping one another, but it will be appreciated that any number of stores 14 can be considered when developing the composite ejection zone 28.

The composite ejection zone 28 includes all of the locations along the longitudinal axis of the stores 14 relative to the common lug position where the sway brace 24 can be made to apply downward force during actuation. These force applying locations of the sway brace 24 correspond to the respective load points of the various stores 14. Some of the locations may be aft of the common lug position and some may be forward of the common lug position. As used herein, the terms force applying location and load point are broadly used and can include a single point, multiple points, an area and/or multiple areas.

Using the composite ejection zone 28, the sway brace 24 can be configured to physically contact the stores 14 in the respective load points and/or have multiple contact places with the stores 14 that aggregate to apply force in the respective load points. For example, the sway brace 24 can have at least one contact location for each type of store 14 and, during ejection of the carried store 14 by actuation of the sway brace 24, the at least one contact location corresponding to the carried store 14 applies a pitch down moment to the carried store. The sway brace 24 also can be configured to avoid or minimize contact of the stores 14 in unintended locations. For example, contact surfaces of the sway brace 24 for a first of the stores 14 can be positioned to be spaced apart from a second of the stores 14 during carriage and/or ejection of the second store 14.

Figure 3:
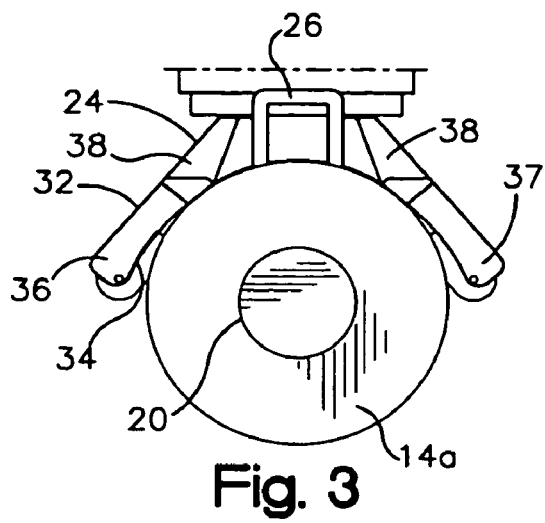
FIG. 3 is a front end view of a portion of the carriage and ejection assembly with a first store type mounted thereto.
Figure 4:
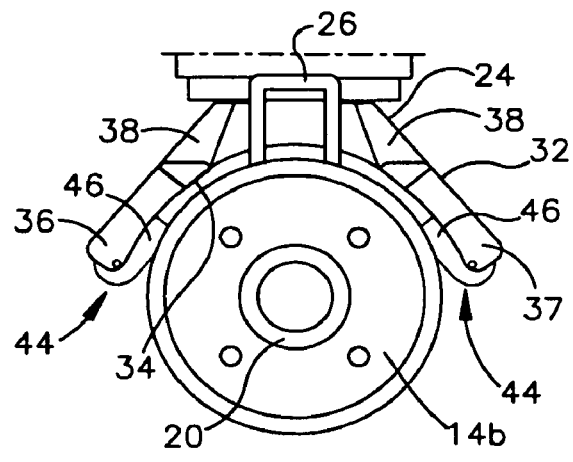
FIG. 4 is a front end view of a portion of the carriage and ejection assembly with a second store type mounted thereto.
Figure 5:
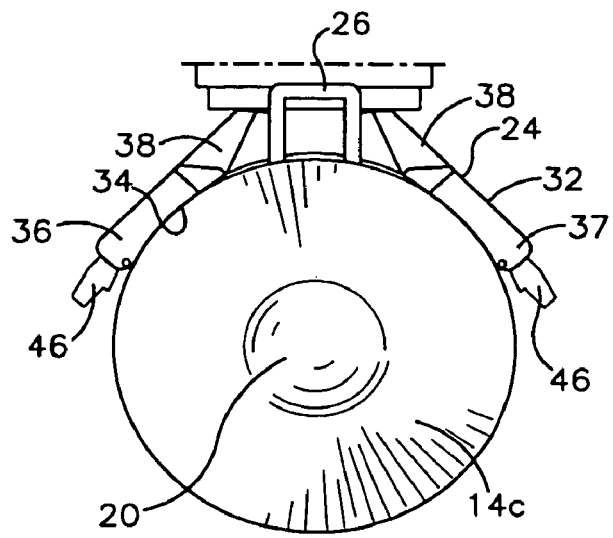
FIG. 5 is a front end view of a portion of the carriage and ejection assembly with a third store type mounted thereto.

With additional reference to FIGS. 3–5, three possible stores 14a, 14b and 14c, each with a different configuration, are respectively illustrated in a carriage position. The interaction of the illustrated stores 14 with the sway brace 24 will serve as examples of the concepts described herein. For example, the illustrations show the sway brace 24, or member attached thereto, configured to physically contact the stores 14 in differing locations. The sway brace 24 is configured to avoid or minimize contact of the stores 14 in locations other than desired. In the illustrated example, the store 14a has a load point 30a (FIG. 2) forward of the load points of the stores 14b and 14c. That is, the stores 14b and 14c have respective load points 30b and 30c (FIG. 2) that are further aft of the lug 26 than the load point 30a of the store 14a.

To accommodate each of the stores 14a–c, the sway brace 24 can have a main section 32 that surrounds a corresponding upper portion of each store 14a–c. The main section 32 can be directly connected to an actuating member (described below). For example, a portion of the main section 32 can have a recess that receives the actuating member. An interior surface 34 of the sway brace 24 is generally curvilinear, but need not follow the path of a uniform arc. The interior surface 34 portion of the main section 32 can be continuous from a starboard end 36 to a port end 37, as illustrated, or non-continuous.

The load point 30a of the store 14a (FIG. 3) can be forward of the main section 32, such as just aft of the lug 26, forward of the lug 26 or otherwise adjacent the lug 26. To apply force during ejection that is aggregated at the load point 30a, the sway brace 24 includes at least one finger 38 that extends in the forward direction from the main section 32. In the illustrated embodiment, there are a pair of fingers 38 that extend in the forward direction from the main section 32. The fingers 38 are spaced apart to straddle the lug 26. The finger 38 or additional finger(s) 28 could be arranged to extend in the aft direction.

In the illustrated example, contact is made between the sway brace 24 and the store 14a (FIG. 3) in three locations, including with an apex of the interior surface 34 of the main section 32 (e.g., in the area where the fingers 38 fork from the main section 32 aft of the lug 26) and with the interior surface of each the fingers 38 at or adjacent respective distal ends the fingers 38. During flight, such contact can reduce swaying or twisting of the store 14a. During ejection, such contact combines to apply force to the load point 30a of the store 14a, thereby applying a pitch down moment on the store 14a.

To further balance and stabilize the store 14a during flight, a stationary block 40 (shown in FIG. 2) can be positioned forward of the sway brace 24 and lug 26. The block 40 can contact the store 14a near the forward end 20 to reduce a pivoting movement about the hang point (e.g., the lug 26) of the store 14a. The block 40 can be connected to a housing 42. The housing 42 can contain a hook latching and ejector assembly, which will be described in greater detail below. However, for purposes of illustration, some components from the hook latching and ejection assembly are shown in dashed lines in FIG. 2.

As indicated, the load point 30b of the store 14b (FIG. 4) is aft of the load point 30a of the store 14a. In addition, the store 14b is diametrally smaller than other stores 14 potentially carried by the assembly 10 (e.g., store 14b has a smaller diameter, thickness and/or width). To apply force during ejection that is aggregated at the load point 30b, the sway brace 14 includes a size adapter mechanism 44. In the illustrated embodiment, the size adapter mechanism 44 includes a pair of spacer blocks 46 respectively attached to the main section 32 adjacent the starboard and port ends 36, 37. The spacer blocks 46 can be connected to the sway brace 24 with spring biased pin mechanisms that allow the spacer blocks 46 to be actuated (e.g., pivoted in a hinge-like movement) between a closed position as shown in FIGS. 3 and 4 and an open position as shown in FIG. 5. In the closed position, the spacer blocks 46 reduce the distance between the starboard end 36 and the port end 37 of the main section 32. The store 14a (FIG. 3) has a progressively reduced diameter aft of the lug 26 and, therefore, in the illustrated embodiment, the spacer blocks 46 do not contact the store 14a even when the spacer blocks 46 are in the closed position.

In the illustrated example, contact is made between the sway brace 24 and the store 14b in two locations, namely with the interior surface of each of the closed position spacer blocks 46. In another arrangement, contact can be made between the sway brace 24 and the store 14b in three locations, namely with the apex of the interior surface 34 of the main section 32 and with the interior surface of each of the closed position spacer blocks 46. In this alternative arrangement, the contact at the sway brace 24 may or may not overlap in a direction along the longitudinal axis of the store 14b with the contact of the spacer blocks 46. In either arrangement, such contact can reduce swaying or twisting of the store 14b during flight. During ejection, such contact combines to apply force to the load point of the store 14b, thereby applying a pitch down moment to the store 14b. It is noted that the fingers 38 are arranged to avoid contact with the store 14b. However, to further balance and stabilize the store 14b during flight, the block 40 can contact the store 14b.

As indicated, the load point 30c of the store 14c (FIG. 5) is aft of the load point 30s of the store 14a. In addition, the store 14c is diametrally larger than stores 14a and 14b. Accordingly, to accommodate the store 14c, the spacer blocks 46 can be placed in the open position. In the illustrated embodiment, the spacer blocks 46, when disposed in the open position, do not contact the store 14c.

In the illustrated example, contact is made between the interior surface 34 of the sway brace 24 and the store 14c. For example, the curvature of the interior surface 34 of the main section 32 can correspond to at least a portion or portions of the curvature of the store 14c to form a contact region(s) between the store 14c and the sway brace 24 from the starboard end 36 to the port end 37. During flight, such contact can reduce swaying or twisting of the store 14c. During ejection, such contact combines to apply force to the load point of the store 14c, thereby applying a pitch down moment to the store 14c. It is noted that the fingers 38 are arranged to avoid contact with the store 14c. However, to further balance and stabilize the store 14c during flight, the block 40 can contact the store 14c.

The foregoing configuration of the sway brace 24 and interaction with stores 14a through 14c is an example of a sway brace 24 implemented to contact plural stores 14 in a manner to apply ejecting force at, or in aggregation to, respective appropriate load points of the stores 14, as well as providing an adjustable size interface for various size stores 14. In one embodiment, the carriage and ejection assembly 12 is arranged to accommodate stores 14 having a maximum diameter of about three inches to about seven inches. However, modifications can be made to accommodate larger or smaller stores 14. Changes to the sway brace 24 and the size adjusting mechanism 44 to accommodate additional or different stores 14 are intended to fall within the scope of the invention as defined by the claims appended hereto. An example modification that does not depart from the invention includes adding a block(s) or other member(s) to the sway brace 24 to accommodate a particular store 14. The added components can be removed to use the assembly 10 with other stores 14. Another example includes providing spacer blocks 46 or other size adjusting mechanism 44 that is adjusted by sliding along portions of the sway brace 24. It is noted that the interior surface 34 of the sway brace 24 can be curved with a uniform or non-uniform radius, can be formed with polygonal surfaces (e.g., facets) and can have proportions that vary in the direction along the longitudinal axis of the stores 14. The sway brace 24 need not have a defined main section 32 or other portion that surrounds a corresponding portion of the carried store 14.

Figure 6:
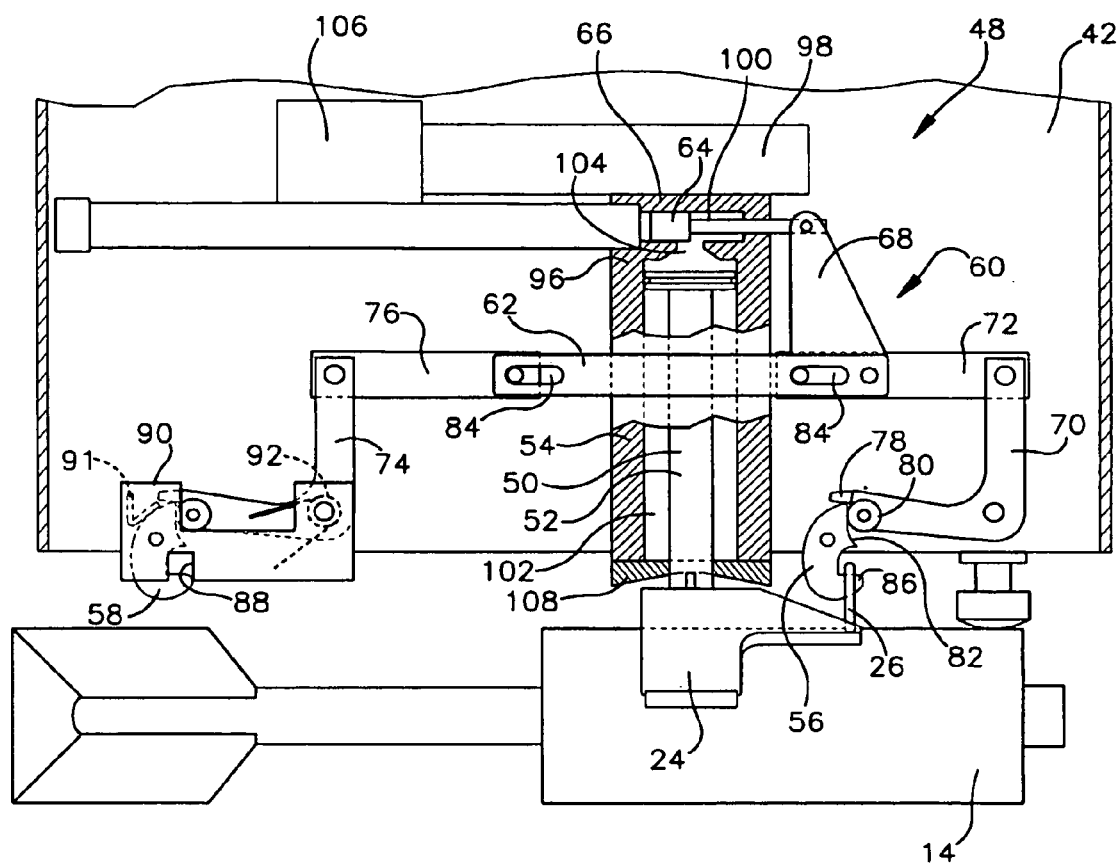
FIG. 6 is a side view of the carriage and ejection assembly shown partially cut away and in a carriage position.
Figure 7:
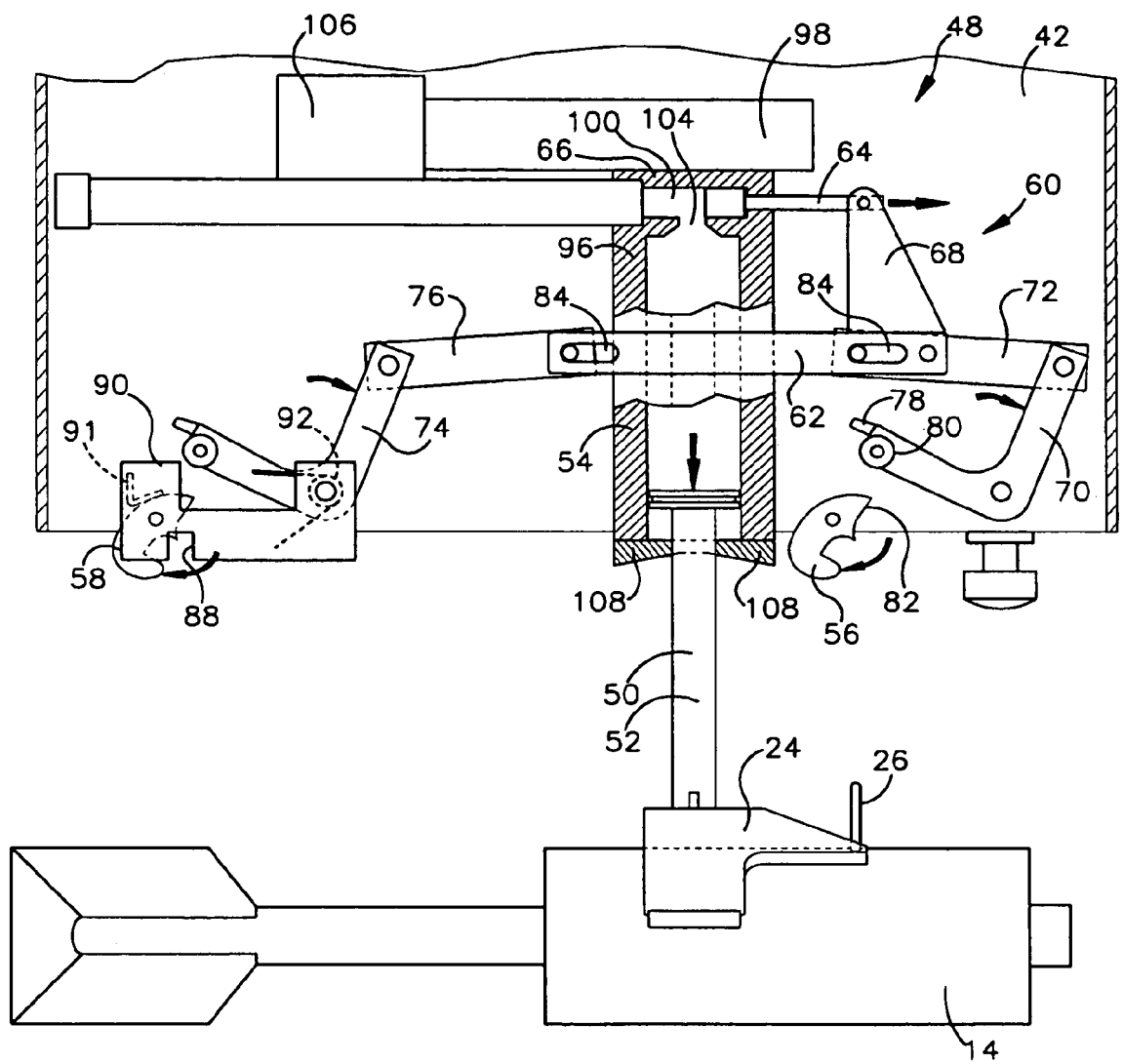
FIG. 7 is a side view of the carriage and ejection assembly shown partially cut away and in an ejection position.
Figure 8:
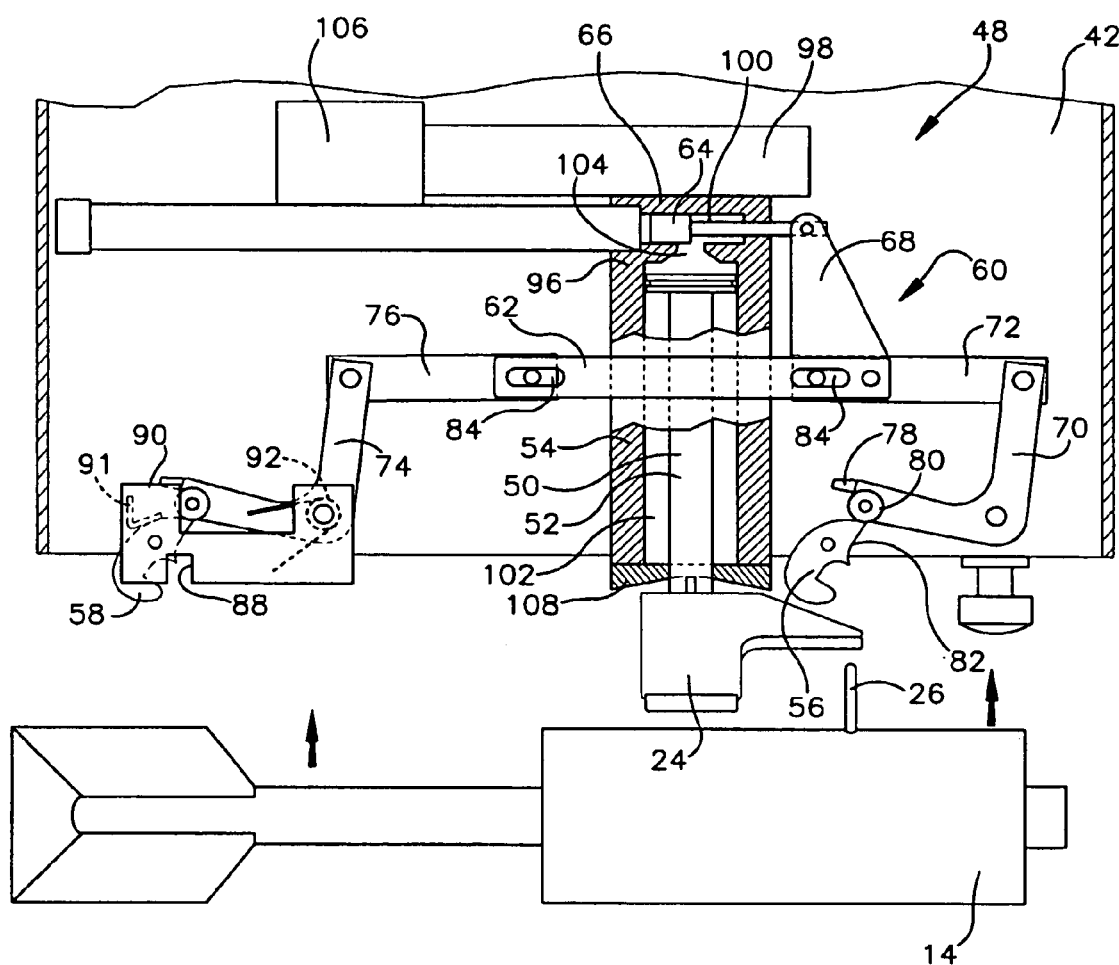
FIG. 8 is a side view of the carriage and ejection assembly shown partially cut away and in a store loading position.

Turning now to FIGS. 6 through 8, a hook latching and ejector assembly 48 of the carriage and ejection assembly 12 is shown. In particular, the housing 42 (FIG. 2) is shown partially removed to show components of the carriage and ejection assembly 12 that are contained within the housing 42. It will be appreciated that the carriage and ejection assembly 12 can be suspended directly from the aircraft 10 or from another rack assembly (sometimes referred to as a "parent rack").

It is possible to combine multiple carriage and ejection assemblies 12 into a single structure, or multiple ejector rack (MER). The MER can be attached to the aircraft 10 or a parent rack on the aircraft 10.

The sway brace 24 is securely connected directly to or integral with a downwardly moveable part 50 of an ejection actuator 54. In the illustrated example, the ejection actuator 54 is a piston and the moveable part 50 is a shaft 52 from the piston. The illustrated piston is a pneumatic piston, but could alternatively be arranged as a hydraulic piston. In other examples, the sway brace 24 can be actuated by a solenoid, motor driven member or other suitable device. In one embodiment, the sway brace 24 is secured to the shaft 52 with one or more shear pins. Alternative connection means can include a threaded connection, welding and forming the shaft 52 and sway brace 24 from a single piece of material. Direct connection of the sway brace 24 to the shaft 52 or integral formation of these components minimizes the number of parts and weight of the latching and ejector assembly 48, consolidates design issues for the sway brace 24 to contact a variety of stores 14 in different appropriate locations, and enhances store 14 orientation control during an ejection stroke of the shaft 52.

The illustrated embodiment of the hook latching and ejector assembly 48 includes a forward hook 56 and an aft hook 58 for securing coordinating lugs 26 of the stores 14. In latching positions, the hooks 56, 58 can draw the lug(s) 26 of the store 14 upward to bring the store 14 into contact with the sway brace 24. The hooks 56, 58 can be independently pinned to the housing 42 to provide respective pivot points for the hooks 56, 58. Each of the hooks 56 and 58 can be selectively rotated between a latch position as shown in FIG. 6 and a release position as shown in FIG. 7. A linkage assembly 60 controls rotational orientation of the hooks 56 and 58 and allows the hooks 56 and 58 to be manually latched and manually released independently of one another. During ejection, both hooks 56, 58 are rotated to the release position by the linkage assembly 60.

The linkage assembly 60 includes a bar 62 that is driven forward by actuation of a moveable part from a hook release actuator 66. In the illustrated embodiment, the hook release actuator 66 is a piston and the moveable part is a shaft 64 from the piston. The illustrated piston is a pneumatic piston, but could alternatively be arranged as a hydraulic piston. In other examples, the bar 62 can be driven by a solenoid, motor driven member or other suitable device. A member 68 can connect the bar 62 to the shaft 64. A forward hook control member, or arm 70, is connected to a forward portion of the bar 62 by a linking member 72 and an aft hook control member, or arm 74 is connected to an aft portion of the bar 62 by a linking member 76. Each of the arms 70, 74 are generally "L-shaped" and have a first leg of the "L" pinned to the respective linking members 72, 76. A second leg of the control arms 70, 74 engage the respective hooks 56, 58 with a stop 78, such as a flange-like member disposed over the hooks, and a wheel 80 disposed forward of the hooks. The legs of the arms 70, 74 respectively join at a pivot point of the arms 70, 74. The pivot points of the arms 70, 74 are pinned to the housing 42 with respective pins 81 (FIG. 2), which allows rotation of the arms 70, 74 while maintaining the relative location of the arms 70, 74 with the housing 42. The pins 81, which can be, for example, keyed or press-fit to the respective arms 70, 74, rotate with the respective arms 70, 74.

The interaction of each of the hooks 56, 58 with the respective arms 70, 74 of the linkage assembly 60 is generally the same. Accordingly, the following description of manually latching a store 14 to the carriage and ejection assembly 12, manually releasing a store 14 from the carriage and ejection assembly 12, and ejecting a store 14 from the carriage and ejection assembly 12 will be made with respect to the forward hook 56 and control arm 70. Operation of the aft hook 58 and control arm 74 will be apparent from this description. Also, to clearly show interaction of the lug 26, hook 56 and arm 70, a forward trapping member 90, a forward leaf spring 91 and a forward torsion spring 92 are not shown, but have the same or substantially the same configuration as the illustrated aft trapping member 90, aft leaf spring 91 and aft torsion spring 92.

To manually latch a store 14 to the hook latching and ejection assembly 48, the hook 56 should be placed in a released, store loading position. An example suitable position is shown in FIG. 8. As will become more apparent below, the store loading position shown in FIG. 8 can result from the normal movement of the components of the hook latching and ejection assembly 48 following ejection of a store 14 (e.g., as illustrated in FIG. 7) or manual release of a store 14. If, however, the hook 56 is in its carriage position (e.g., as illustrated in FIG. 6), manual release of the hook can be carried out to place the hook 56 in the store loading position. Manual release of the hook 56 can be accomplished in the manner that manual release of a store 14 is carried out, which is discussed in greater detail below. Briefly, manual release of the hook 56 can be accomplished by rotating the arms 70 at a corresponding crank point 94 (FIG. 2) while leaf spring 91 applies rotational force to the hook 56.

In the store loading position of FIG. 8, the hook 56 is held open by the spring 91 and the hook engaging end of the arm 70 can be disposed over the hook 56 (e.g., wheel 80 can be urged to rest on an outer upper surface of the hook 56 by arm 70 "reset" force of torsion spring 92).

The store 14 can be elevated such that a top of the lug 26 enters a receiving slot 88 of a trapping member 90 and enters a recess of the hook 56 that is at least partially defined by a finger 86. The lug 26 can be brought into contact with an interior surface of the hook 56 located above the finger 86. Continued upward force can be applied to the store 14 to rotate the hook 56 against the spring 91 and towards the latched position. Upon sufficient rotation of the hook 56, the arm 70 can "drop" to its latched position, such as the position shown in FIG. 6. For instance, the reset force of the torsion spring 92 can urge the hook end of the arm 70 downward. In one embodiment, the torsion spring is located at the pivot point of the arm 70 and has a first end connected to the arm 70 and a second end connected to the trapping member 90. During this movement of the arm 70, the wheel 80 can roll along a wheel engagement surface 82 of the hook 56 and the member 72 can slide with respect to bar 62. In the latched position, the stop 78 can press against the top outer surface of the hook 56 at the urging of the spring 92. As a result, the hook is "jammed" by stop 78 and wheel 80, thereby counteracting rotation of the hook 56 towards the release position. In the retained position, the lug 26 is trapped above the finger 86 and within the edges of the trapping member 90 defining the receiving slot 88.

When the store 14 is latched in this manner, the sway brace 24 contacts the store 14 in the locations appropriate for the particular store 14 as described above. Also in this position, the store 14 can be carried by the aircraft 10 (FIG. 1) during flight. As will be appreciated, when the store 14 has two lugs 26, the lugs 26 can be latched to the respective hooks 56, 58 independently of one anther. In particular, the independent connection of the respective linking members 72, 76 to the bar 62 allow independent rotation of the forward hook 56 and arm 70 and the aft hook 58 and arm 74. During latching, the bar 62 can remain stationary.

As indicated, the lug 26 can be manually released from the hook 56, such as to remove the store 14 from the aircraft 10. With additional reference to FIG. 2, the lug 26 can be released by inserting a tool through an opening in the housing 42 and into a corresponding receptacle 94 (FIG. 2) of the pin 81. The tool can be used to rotate the pin 81 and the arm 70 therewith in a direction to move the wheel 80 in an upward direction and against the reset (or "counter-rotational") force applied by the spring 92. The opposite end of the arm 70 will move and drag the linking member 72 (e.g., the pin that connects the linking member 72 to the bar 62 will travel in slot 84). Once the wheel 80 clears the wheel engagement surface 82 of the hook 56, the hook 56 will rotate to the release position (FIGS. 7 and 8) by force applied by spring 91 and/or under downward force exerted by the lug 26 against the finger 86 (e.g., by gravity acting on the store 14 and/or by pulling of the store 14). Once sufficiently rotated, the hook 56 will release the lug 26 and the store 14 will be freed. As is conventional, manually latching and releasing of the store 14 can be assisted by a cart having means to raise and lower the store 14. After release of the store 14, the hook 56 and arm 70 can be disposed in the release position, such as illustrated in FIG. 8. For example, the top of the hook 56 will be rotated forward by spring 91 and the wheel 80 can rest on the hook 56 when manual rotational force is no longer applied to the arm 70.

The linkage assembly 60 allows the hooks 56, 58 to be manually latched and released independently, which results in the ability to load and unload two lug 26 stores 14 more easily than if the hooks 56, 58 moved dependently of one another. In addition, if one of the two lugs 26 is adjustable (e.g., moveable along the length of the store 14), one of the lugs 26 can be mounted and the other lug 26 can be positioned by aligning its relative location to the corresponding hook 56 or 58 before loading. Furthermore, single lug 26 stores 14 can be loaded and unloaded without regard to the position of the unused hook 56 or 58. As will become more apparent, the linkage assembly 60 allows suitable ejecting of a one lug 26 store 14 even if the unused hook 56 or 58 is in an open position (e.g., the release position) prior to ejecting of the store 14.

With continued reference to FIGS. 6 through 8, the linkage assembly 60 and sway brace 24 can be selectively actuated to eject the store 14 during flight. Specifically, the shaft 64 can be actuated to move the member 68 and the bar 62 forward. The bar 62, in turn, will push the linking member 72 and pull the linking member 76 forward, which results in respectively rotating the forward arm 70 and the aft arm 74. Rotation of the arms 70, 74, which is against the reset force of the spring 92, will free the hooks 56, 58. When freed, the hook(s) 56, 58 will rotate under the force applied by springs 91 and/or downward force from the lug(s) 26. The downward force from the lug(s) 26 can result from gravity and/or movement of the sway brace 24 (described below) acting upon the store 14. As the bottom of the hook(s) 56, 58 rotate in an aft direction, the lug(s) 26 will move past the finger(s) 86 and out of the receiving slots 88.

After the hooks 56, 58 have been released, the shaft 52 can be actuated to downwardly move the sway brace 24, which results in a transfer of force to the store 14 in the areas where the sway brace 24 and/or spacer blocks 46 contact the store 14. The result of the force applied to the store 14 is to propel the store 14 away from the aircraft, preferably with a pitch down moment. If connected to the store, an umbilical can separate. Following such ejection, the store 14 can fire a rocket, engine or other propulsion means or travel ballistically away from the aircraft 10.

The ejection actuator 54 can be placed in series with and following the hook release actuator 66 or otherwise arranged to limit movement of the sway brace 24 unless the hooks 56, 58 are released. In the example embodiment, such an arrangement can minimize activation of the moveable part 50 prior to release of the hooks 56, 58. In the illustrated embodiment, the piston used as the hook release actuator 66 is formed together with the piston used as the ejection actuator 54 as part of a piston unit 96. The piston unit 96 is mounted to a strong back 98 for support. The piston unit 96 has a first bore 100 in which the shaft 64 travels and a second bore 102 in which the shaft 52 travels. The bores 98, 100 are fluidically coupled by a passage 104. The shaft 64, and particularly a head of the shaft 64, acts a valve for the passage 104. For example, in the latch/carriage position, the shaft 64 covers passage 104 and when pushed forward for ejecting of the store 14 (e.g., the release position), the shaft 64 travels past the passage 104. A compressor 106, such as an air compressor for pneumatic pistons or a pressurizer to hydraulic pistons, can be connected to pressurize the first bore 100 and direct the shaft 64 forward to result in release of the hooks 56, 58. After the shaft 64 clears the passage 104, the pressurized air can enter the second bore 102 through the passage 104 and pressurize the second bore 102, thereby propelling the shaft 52, sway brace 24 and store 14 downward to achieve ejection of the store 14. In this manner, pressurization of the second bore 102 and movement of the shaft 52 is at least in part dependent on movement of the shaft 64 as the hook release actuator 66 is operatively upstream and in series with the ejection actuator 54.

As will be appreciated, the foregoing embodiment is one implementation of a system than minimizes the risk of lock-shut firing (e.g., where ejecting force is applied to the store 14, but the lug 26 is secured). Other systems of minimizing lock-shut firing and/or increasing the chance that the moveable part 50 is actuated only after successful release or unlocking of the lug retaining mechanism are intended to fall within the scope of the present invention as defined by the claimed appended hereto. Other techniques can include the incorporation of sensors and/or microprocessor control of the ejection process, for example.

The compressor 106 can be mounted to be carried by the aircraft 10. To conserve space, the compressor 106 can be mounted in the housing 42 and/or in the strong back 98. Carrying the compressor 106 with the aircraft 10 reduces the need for pre-pressurization equipment to be located and used at the landing site of the aircraft 10.

After ejection, the shafts 64 and 52 can be returned to their respective carriage positions (e.g., as illustrated in FIG. 6). For example, the shafts 64 and 52 can be returned by spring assemblies contained in the piston unit 96. After ejection, the hook 56 and arm 70 can be disposed in the release position, such as the position illustrated in FIG. 8. For example, the hook 56 will be rotated forward by spring 91 and the wheel 80 can come to rest on the hook 56 when members 62 and 72 return to their carriage positions (FIG. 6) and corresponding rotational force is no longer applied to arm 70.

After ejection and during return, the sway brace 24 and shaft 52 are exposed to an air stream as the aircraft 10 travels. The air stream and/or ejection process may result in some rotation of the sway brace 14 and shaft 52. To urge the sway brace 24 and shaft 52 back into a forward alignment, the base of the unit 94 can include alignment blocks 108. The alignment blocks 108 can include opposing wedge shaped members that contact an upper surface of the sway brace 24 as the sway brace 24 returns to the carriage position. The corresponding shapes of the sway brace 24 and alignment blocks 106 urge the sway brace 24 to come to rest in a forwardly aligned position.

Although particular embodiments of the invention have been described in detail, it is understood that the invention is not limited correspondingly in scope, but includes all changes, modifications and equivalents coming within the spirit and terms of the claims appended hereto.

What is claimed is:

1. A carriage and ejection assembly for retaining different types of stores to an aircraft and selectively ejecting a carried one of the stores away from the aircraft, comprising:
    a sway brace having a plurality of fixed contact locations for accommodating the different types of stores such that each store is contacted by a different set of the fixed contact locations and, wherein during ejection of the carried store by actuation of the sway brace, the set of fixed contact locations corresponding to the carried store applies a pitch downward moment to the carried store with respect to the aircraft; and
    an ejection actuator coupled to the sway brace for actuating the sway brace.

2. The carriage and ejection assembly according to claim 1, wherein the ejection actuator includes a moveable piston shaft that is directly connected to the sway brace.

3. The carriage and ejection assembly according to claim 1, wherein the sway brace includes a portion that surrounds a corresponding upper portion of the carried store.

4. The carriage and ejection assembly according to claim 3, wherein the surrounding portion is configured to contact at least one type of store when a store of the at least one type is placed in the carried position.

5. The carriage and ejection assembly according to claim 3, wherein the surrounding portion includes a size adaptor mechanism that can be selectively positioned to change a distance between a first point on the surrounding section and a second point on the surrounding section.

6. The carriage and ejection assembly according to claim 5, wherein the size adaptor includes at least one hinged spacer block.

7. The carriage and ejection assembly according to claim 6, wherein a first position of the spacer block allows contact of the spacer block with a first store type and a second position of the spacer block allows contact of a second store type that is diametrally larger than the first store type with the surrounding portion, wherein the spacer blocks are arranged with the sway brace to be toggled between the first position and the second position prior to engagement of the carried store with the sway brace.

8. The carriage and ejection assembly according to claim 1, wherein the sway brace includes at least one finger projecting in the direction of a longitudinal axis of the carried store, the finger configured to contact at least one of the store types and not another of the store types.

9. The carriage and ejection assembly according to claim 8, wherein the sway brace includes a pair of the longitudinally directed fingers that are spaced apart such that a lug of the carried store is disposed between the fingers.

10. The carriage and ejection assembly according to claim 1, wherein the set of fixed contact locations corresponding to the carried store is effective to reduce twisting of the carried store during flight of the aircraft.

11. A carriage and ejection assembly for retaining a store to an aircraft and selectively ejecting the store away from the aircraft, comprising:
    a sway brace having a plurality of fixed contact locations for accommodating the different types of stores such that each store is contacted by a different set of the fixed contact locations, wherein the set of fixed locations corrresponding to a store, during actuation of the sway brace, applies a pitch down moment to the store with respect to the aircraft; and
    an ejection actuator having a moveable part for actuating the sway brace, the moveable part directly connected to the sway brace.

12. The carriage and ejection assembly according to claim 11, wherein the ejection actuator is a piston and the moveable part is a piston shaft.

13. A carriage and ejection assembly for retaining a store to an aircraft and selectively ejecting the store away from the aircraft, comprising:
    a sway brace that contacts the store in one or more locations that, during actuation of the sway brace, applies a pitch downward moment to the store with respect to the aircraft;
    at least one hook that selectively retains a lug of the store and positions the store to be contacted by the sway brace;
    a hook release actuator coupled to a hook control member that when actuated by movement of the hook release actuator releases the hook; and
    an ejection actuator coupled to the sway brace to actuate the sway brace, wherein the ejection actuator is connected in series with and downstream from the hook release actuator.

14. The carriage and ejection assembly according to claim 13, wherein actuation of the ejection actuator is dependent upon actuation of the hook release actuator.

15. The carriage and ejection assembly according to claim 13, wherein the hook release actuator is a first piston and the ejection actuator is a second piston.

16. The carriage and ejection assembly according to claim 15, wherein a shaft of the first piston is disposed within a first bore of a piston unit, a shaft of the second piston is disposed within a second bore of the piston unit, and the first and second bores are fluidically connected via a passage.

17. The carriage and ejection assembly according to claim 16, wherein the first shaft acts as a valve for the passage.

18. The carriage and ejection assembly according to claim 13, wherein the carriage and election assembly is configured to retain different types of stores and the sway brace has at least one contact location for each type of store such that during ejection of the carried store the at least one contact location corresponding to the carried store applies the pitch downward moment to the carried store.

19. The carriage and ejection assembly according to claim 13, wherein the ejection actuator has a moveable part for actuating the sway brace, the moveable part being directly connected to the sway brace.

20. The carriage and ejection assembly according to claim 13, further comprising a compressor mounted to be carried by the aircraft, and wherein the hook release actuator and the ejection actuators are pistons that are pressurized by the compressor.

21. The carriage and ejection assembly according to claim 20, wherein the compressor is an air compressor and the pistons are pneumatic pistons.

22. A carriage and ejection assembly for retaining different types of store to an aircraft and selectively ejecting a carried one of the stores away from the aircraft, each store having one of a single lug or a pair of lugs, comprising:
- a first hook that selectively retains the lug of single lug stores and a first lug of the double lug stores;
- a second hook that selectively retains a second lug of the double lug stores;
- a control member for each hook, each control member having a retaining position in which the control member asserts a retaining force on the corresponding hook and a release position to free the corresponding hook such that the hook may pivot, each control member is positionable independently of the other control member to individually release the corresponding hook for unlatching of the corresponding lug; and
- a hook release actuator coupled to each control member to simultaneously actuate each control member to the release position for ejection of the carried one of the stores;
- wherein the hook release actuator is connected to each control member by a linkage assembly that includes a slotted bar and travel of the control members with respect to corresponding slots of the bar allows for the independent positioning of the control members.

23. The carriage and ejection assembly according to claim 22, wherein each control member in the retaining position allows the corresponding hook to pivot independently of the other hook when latching force is applied to an outside surface of the hook by the corresponding lug, the latching force moving a finger of the hook so that continued latching force causes the lug to clear the finger.

24. The carriage and ejection assembly according to claim 22, further including a sway brace having at least one contact location for each type of store, wherein during ejection of a carried one of the stores by actuation of the sway brace, the at least one contact location corresponding to the carried store applies a pitch downward moment to the carried store with respect to the aircraft.

* * * * *